March 20, 1956 — A. WADOZ — 2,738,817
BUN SLICING MACHINE
Filed May 4, 1951 — 3 Sheets-Sheet 1

Inventor
Andrew Wadoz
by Fidler, Crouse & Beardsley
Attys.

March 20, 1956 A. WADOZ 2,738,817
BUN SLICING MACHINE
Filed May 4, 1951 3 Sheets-Sheet 2
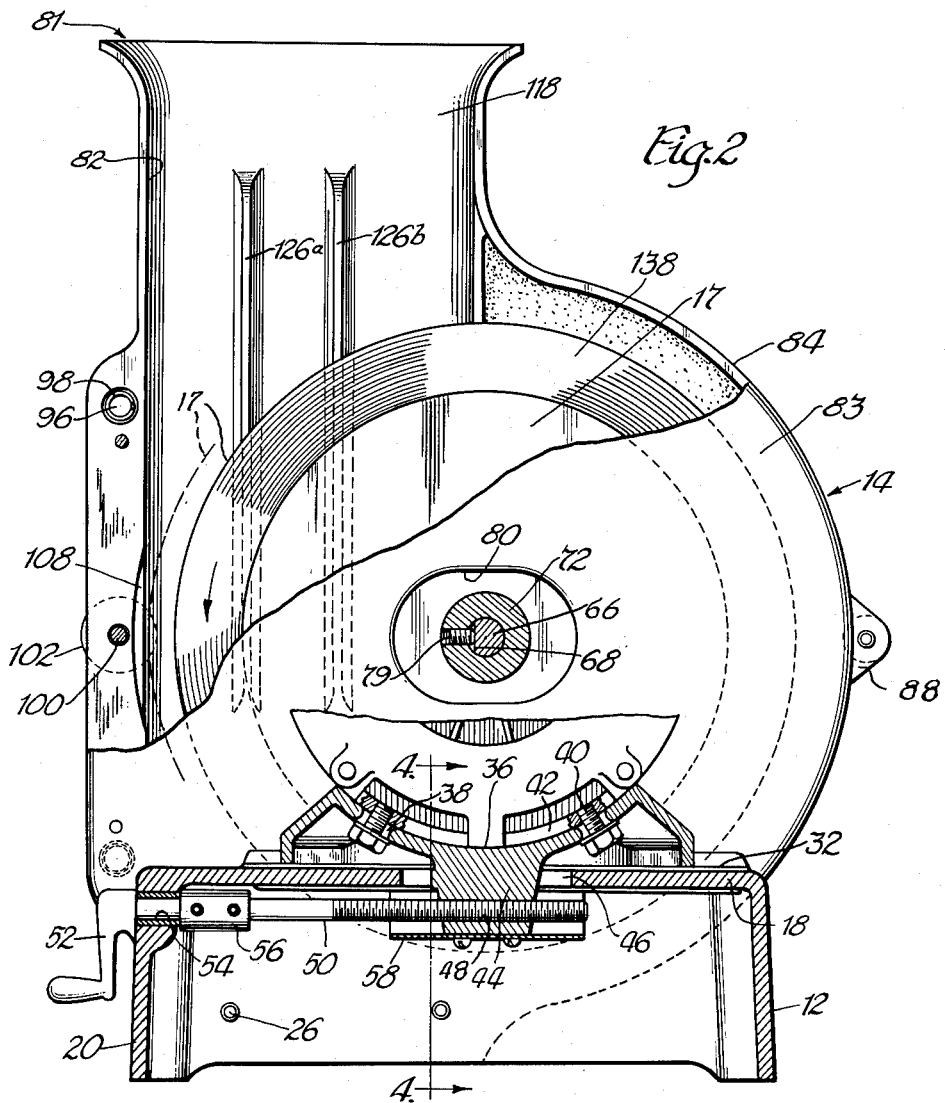
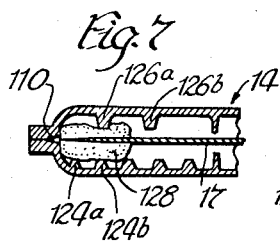
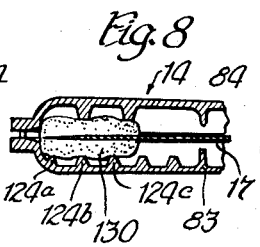
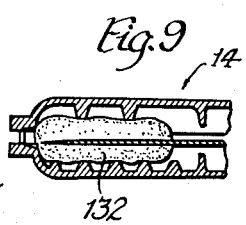
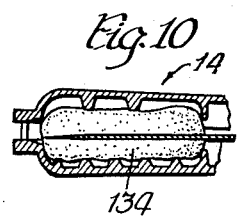
Inventor
Andrew Wadoz
by Fidler, Crowe & Beardsley
Attys.

March 20, 1956  A. WADOZ  2,738,817
BUN SLICING MACHINE
Filed May 4, 1951  3 Sheets-Sheet 3
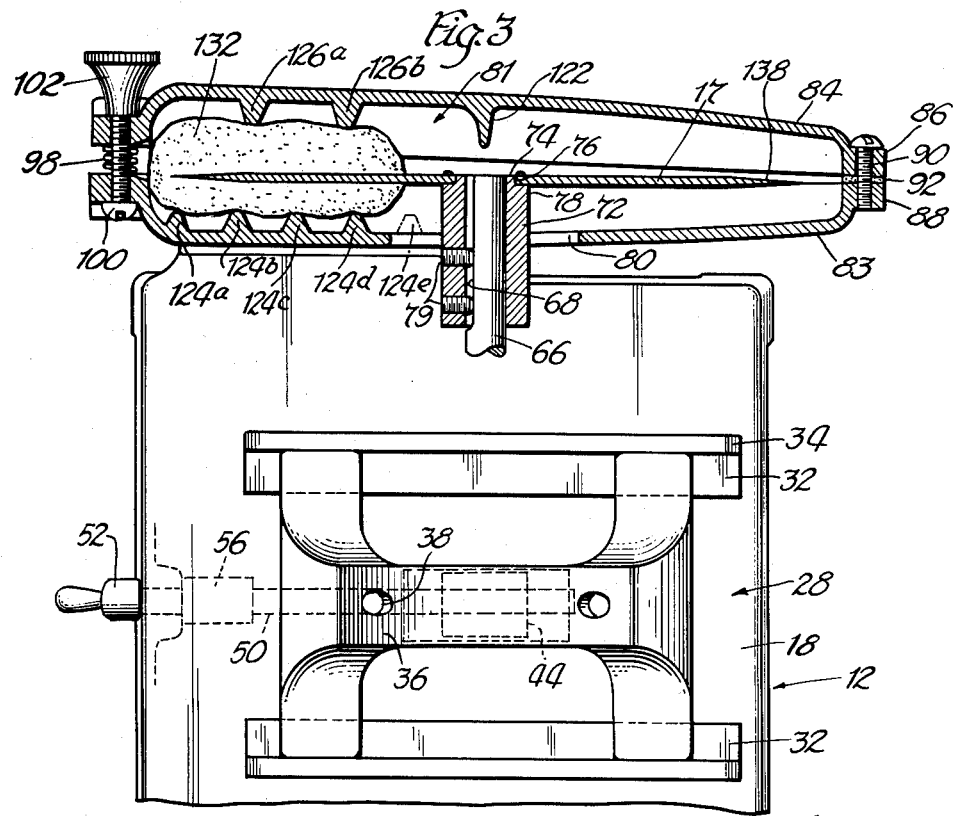
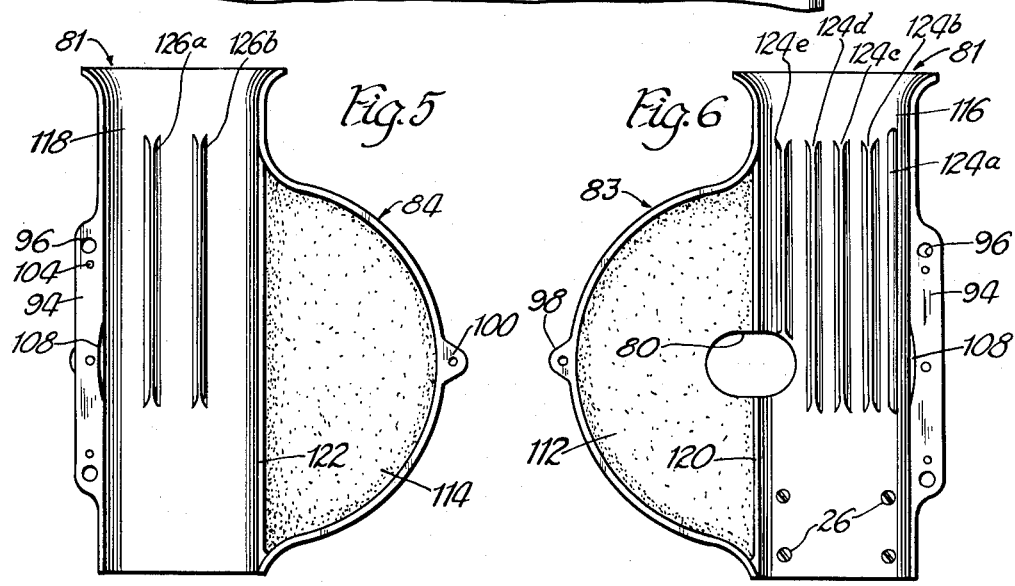
Inventor
Andrew Wadoz
by Fidler, Crowe & Beardsley
Attys.

United States Patent Office 2,738,817
Patented Mar. 20, 1956

2,738,817

BUN SLICING MACHINE

Andrew Wadoz, Milwaukee, Wis.

Application May 4, 1951, Serial No. 224,532

10 Claims. (Cl. 146—73)

This invention relates to a machine for slicing buns of the character used for making sandwiches, such as frankfurter sandwiches, hamburger sandwiches, etc.

An object of the invention is the provision of a bun slicing machine effective for slicing buns of any of a wide variety of shapes and sizes.

Another object is the provision of a bun slicing machine capable of effectively slicing buns regardless of the condition of the buns, that is, regardless of whether they are soft or hard, hot or cold, fresh or old, etc.

Another object is the provision of a machine for slicing buns having such novel construction and arrangement of parts as to enable adjustment for effecting slicing of the buns partially through, or entirely through, as desired.

Still another object is the provision of a bun slicing machine having a rotating blade for slicing the buns in which the blade, in addition to performing the slicing operation, carries the buns through the machine, whereby the operator of the machine need only feed the buns to the machine in the slicing operation.

A further object is the provision of a bun slicing machine embodying gravity feed of the buns from the inlet to the slicing position, eliminating the necessity of manually force feeding the buns into or through the machine.

A further object is the provision of a machine for slicing buns, having means effective, in the operation of the machine, for maintaining the buns in proper relative position and against displacement therefrom by the slicing means of the machine, whereby a clean cut of the buns is produced.

A more specific object is the provision of a bun slicing machine of the character referred to, having a guide channel therethrough for the passage of buns, in which the guide channel has longitudinal ribs on its inner surface for engagement by the buns, whereby the buns are prevented from being rotated or otherwise undesirably displaced by the slicing means in the slicing operation, with the result that a clean cut of the buns is produced.

A still further object of the invention is the provision of a gun slicing machine having a guide channel for the passage of buns therethrough in the slicing operation, having a novel construction for enabling adjustment of the structural elements making up the guide channel for accommodating buns of various thicknesses.

Still another object is the provision of a bun slicing machine having a guide channel for the passage of buns therethrough in which the structural elements making up the guide channel are adjustable for accommodating buns of various thicknesses, the adjustable elements being provided with longitudinal ribs on their inner surfaces for engagement with opposite sides of the buns, whereby, by reason of the ribs engaging the surfaces of the buns, greater latitude is permitted in making adjustments for any particular size of bun.

A still further object is the provision of a bun slicing machine utilizing a high-speed, smooth-edge blade for slicing buns.

Another object is the provision of a bun slicing machine utilizing a high-speed, smooth-edge blade operating in such manner as to engage and slice the buns and carry them through the machine, and means for frictionally engaging the buns for establishing a retarding reaction to the action of the blade in slicing the buns and carrying them through the machine.

Other objects and advantages of the invention will become apparent upon reference to the following detailed description, taken in conjunction with the accompanying drawings, in which:

Fig. 2 is a view taken on line 2—2 of Fig. 1;

Fig. 3 is a view taken on line 3—3 of Fig. 1;

Fig. 5 is an elevational view, on a reduced scale, of the inner surface of the outer housing half of the slicing machine proper;

Fig. 6 is an elevational view, on a reduced scale, of the inner surface of the inner housing half, complementary to the housing half of Fig. 5; and Figs. 7 to 10, inclusive, are reduced scale horizontal sectional views of a portion of the slicing machine proper illustrating buns of different sizes as positioned in slicing operations.

Figure 1:
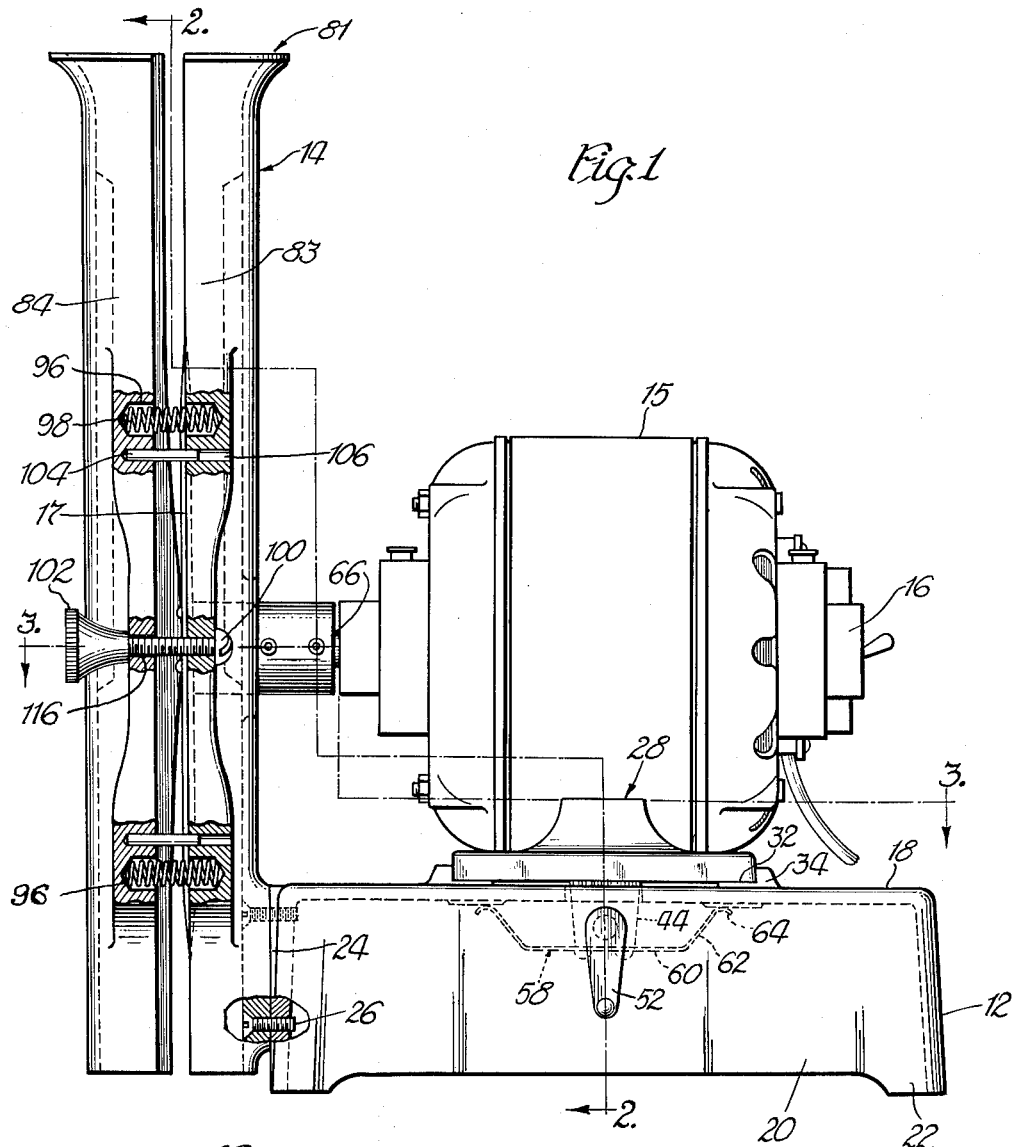
Figure 1 is a front elevational view of the bun slicing machine, with certain portions broken away and shown in section.

Referring now in detail to the drawings, the bun slicing machine is illustrated as a whole in Fig. 1 and includes three main portions, namely, a base 12, a housing 14 and a motor 15, which may be an electric motor having a suitable control switch 16, for rotatably mounting the slicing knife or blade 17 in the housing 14 for slicing the buns. The base 12 is utilized for supporting the other parts of the machine and is adapted for placement on a table or bench in such a manner that the housing 14 is disposed beyond the edge of the table so that the buns, on being sliced, are permitted to drop into a receptacle placed beneath the outlet of the housing as will be explained later in detail.

The base 12 and housing 14 may be formed of any suitable material but are preferably aluminum castings. The base takes the shape generally of an inverted pan, having a top element 18 and a surrounding depending skirt portion 20 terminating in supporting projections or feet 22 adapted for directly resting on the supporting table or bench. The illustration shows the base as slightly downwardly diverging, but this is so formed for appearance sake and when so formed, is provided with a built-up portion 24 at one side having a vertical surface for engagement by a corresponding vertical surface on the lower portion of the housing 14, the latter being secured to the base by suitable means such as screws 26 inserted through holes in the adjacent housing half and threaded into tapped holes in the wall of the base. The housing is thus supported in vertical position. The heads of the screws 26 are preferably flush with the inner surface of the housing half so as not to detract from the smooth inner surface of the housing.

The motor 15 is supported on the base 12 for horizontal adjusting movements for adjusting the blade 17 for a purpose and in a manner to be later described. The supporting means for the motor includes a bracket 28 having a generally flat base portion 30 supported on laterally spaced fore-and-aft extending bearing surfaces 32 formed on the top element 18 of the base. Upstanding ribs 34 at the outer edges of the surfaces 32 guide the bracket 28 in its sliding movements. The adjusting movements of the motor are toward and from the observer as viewed in Fig. 1 and transversely as viewed in Fig. 2. The bracket 28 includes a concave cradle shape surface for seating of the motor, the latter being cylindrical in shape. The bracket is provided with a pair of openings 38 for receiving suitable screws 40 inserted freely therethrough and threaded into tapped holes in elements 42 forming a portion of the frame of the motor. The bracket 28 has a downwardly extending projection 44 extending through an elongated opening 46 in the top element 18 of the base and is provided with a threaded opening 48 for receiving a threaded adjusting shaft 50 extending through the front side wall portion of the depending skirt 20 of the base. The outer end of the shaft 50 is provided with a crank 52 fixed thereto by any suitable means, such as a set screw, a bushing 54 providing bearing support for the shaft 50 in the opening in the base, while a collar 56 is secured to the shaft 50 immediately inside the base, the collar and the crank 52 abutting against opposite sides of the base element for securing the shaft against axial thrust due to the rotation thereof and consequent adjusting movements of the motor. Upon rotation of the crank 52 in one direction or the other, the bracket 28 and the motor are adjusted horizontally. The ends of the slot 46 serve as stop means for engagement by the projection 44 for limiting the adjusting movements of the bracket and the motor.

Figure 4:
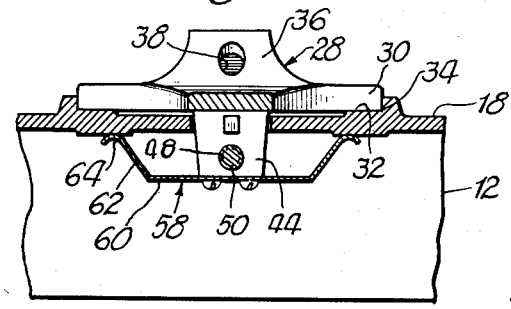
Fig. 4 is a view taken on line 4—4 of Fig. 2.

For the purpose of suitably anchoring the motor against displacement from its intended position and to eliminate undesirable metallic vibration sound a motor tension bracket is employed which, in the present illustration, takes the form of a leaf spring 58 which, as illustrated in Fig. 4, includes a flat central portion 60 secured directly to the bottom surface of the projection 44 with wings 62 having end portions 64 yieldingly engaging the under surface of the top element 18 of the base. The motor tension bracket 58 yieldingly retains the motor in solid position on the base and prevents undesirable metallic sound such as may be caused by vibration of the bracket on the base. The bracket 58 is, of course, enabled to slide with respect to the top element of the base in the adjusting movements of the motor.

The motor 15 is provided with the usual drive shaft 66 having a flat surface 68 (Fig. 3). The slicing blade 17, above referred to, is shown best in Figs. 2 and 3 and is in the form of a smooth-edge, circular disk having certain characteristics to be referred to later. The blade is provided with a tubular hub 72 having an extension 74 of reduced diameter fitted in a central hole 76 in the blade, the blade resting against a shoulder 78 formed by the extension and secured to the hub by means of suitable screws. The hub is provided with the usual set screws 79, engageable with the flat surface 68 of the drive shaft of the motor. The hub and shaft extend through a horizontally elongated slot 80 in the housing 14.

The housing 14 includes a vertical, straight bun guide channel 81 open at top and bottom, into which the buns are inserted for the slicing operation. The blade 17 has a portion extending into the bun guide channel and is adapted for adjustment into a position wherein its edge is closely adjacent the wall 82 of the guide channel which for the purpose of reference will be termed the front wall thereof. It is to be noted that the slicing blade lies in and is rotatable in a plane extending longitudinally of the guide channel.

The housing 14 includes an inner housing half 83 and an outer housing half 84, which together with the blade 17 form the slicing machine proper. The housing halves 83 and 84 are hingedly connected together by lugs 86 and 88, one having a hole for freely receiving a screw 90 and the other a tapped hole into which the screw is threaded. A resilient washer 92 is interposed between the lugs for the usual purpose. The inner surface of the lug 86 is inclined at a small angle (about 5°) to the plane of the meeting edges of the housing halves so as to furnish greater bearing surface with the other lug when the housing halves are swung apart to a position such as illustrated in Fig. 3.

The front or swinging edges of the housing halves are provided with surfaces 94 having recesses 96 for the reception of compression springs 98. A screw 100 is threaded in a tapped hole in the inner housing half adjacent the front thereof and projected freely through a hole in the outer housing half where a thumb nut 102 is threaded thereon for adjustably moving the swinging edges of the housing halves relatively together, the parts being urged apart by the spring 98. Guide pins 104 press fitted in one of the housing halves are slidable in holes 106 in the other for guiding the housing halves in their relative adjusting movements. By relatively moving the housing halves toward and from each other, the bun guide channel 81 is enlarged or reduced for accommodating buns of different sizes. Each of the housing halves is provided with a beveled portion 108, the two beveled portions, when fitted together, forming a recess or shallow cavity 110 (Figs. 7–10) for providing clearance for the slicing blade 17 and permitting the latter to be moved into close proximity to the front wall 82 of the bun guide channel.

The housing halves are provided with semicircular portions 112 and 114 for enclosing the rear portion of the blade. The guide channel 81 is formed by generally concave, vertically extending portions 116 and 118 defined at the rear by vertical ribs 120 and 122 and at the front by respective elements of the front wall 82 of the guide channel. The concave portions 116 and 118, as will be noted, are arranged on respectively opposite sides of the plane of the slicing blade 17. The blade is fixed against axial movement and positioned substantially in the plane of the meeting edges of the housing halves when the latter are fitted tightly together.

For the purpose of guiding the buns through the guide channel 81 in the slicing operation and preventing rotation or other undesirable displacement of the buns, I have provided a plurality of ribs for engagement by the buns, these ribs also guiding the buns through the machine. The ribs referred to are indicated at 124a, 124b, 124c, 124d and 124e on the guide portion 116, and 126a and 126b on the guide portion 118. All of these ribs extend vertically, i. e., longitudinally of the guide channel 81, extending from adjacent the top thereof to a position well below the horizontal plane of the axis of the blade. The ribs 124 and 126 are respectively disposed in transverse spaced relation, that is, parallel with the plane of the blade. The spacing of the ribs is such that certain groups of ribs take effect in the slicing operation of the different sizes of buns. As mentioned above, the slicing machine is designed for slicing buns of various sizes and shapes. There are four well known kinds of buns utilized in making sandwiches such as are commonly served in eating establishments. These buns are those commonly used for frankfurters, hamburgers, hot beef and barbecues. The frankfurter bun is relatively long and of minor width. The other three are usually round and of respectively different sizes; the hamburger bun is recognized as a 3" bun; the hot beef bun as a 4" bun; and the barbecue bun as a 5" bun. These four buns are represented respectively in Figs. 7 to 10, Fig. 7 illustrating a frankfurter bun, Fig. 8 a 3" round hamburger bun, Fig. 9 a 4" round hot beef bun and Fig. 10 a 5" round barbecue bun. The buns are usually somewhat proportional in thickness to their other dimensions, but such proportions are not uniform and buns of any one size may be of various thicknesses.

In the operation of the machine the buns are merely dropped into the bun guide channel 81 at the top and upon rotation of the slicing blade 17 (counterclockwise as viewed in Fig. 2), the bun is sliced by the blade, carried through the guide channel and discharged out through the bottom end thereof into a suitable receptacle. Since the slicing blade 17 is fixed in spaced relation to the inner housing half 83, the buns are inserted into the guide channel preferably with the bottom surface thereof facing the guide channel element 116 and in engagement with the ribs 124 on that element, because it is usually desired that the bottom half of the bun be of fixed thickness, letting the top half be of whatever thickness it will. The frankfurter bun 128 in Fig. 7 is represented as having its long dimension perpendicular to the paper, its transverse dimension being such that the bun engages the two ribs 124a and 124b on the one side and the single rib 126a on the other side. These three ribs form a group for engagement by a bun of this size, namely a frankfurter bun. The bun, on being dropped into the bun guide, drops down onto the slicing blade 17 which, because of its direction of rotation (counter-clockwise as viewed in Fig. 2), engages the bun and forces it to the left against the front wall 82 of the bun guide channel. The blade thereupon slices the bun and, due to the rotating movement of the blade, the bun is carried downwardly through the guide channel and is forced out through the open bottom thereof. The 3" hamburger bun 130 in Fig. 8, being of greater transverse dimension, in the direction of the plane of the blade, engages a greater number of ribs, namely, three of the ribs 124 and may engage both ribs 126. The 4" hot beef bun 132, being of greater transverse dimension than the previous ones mentioned, engages four of the ribs 124 and the two ribs 126 on the opposite side. The 5" barbecue bun 134 in Fig. 10, being the largest, engages all of the ribs 124 and 126.

Figs. 7 to 10, while illustrating buns of various sizes, also show the housing halves 83 and 84 in various positions of adjustment toward and from each other. As mentioned above, the large size buns are normally thicker than the smaller size buns and for this reason the housing halves are adjusted apart for slicing the large buns. However, buns of any one particular size may vary in thickness and this variation in thickness may be compensated for by adjusting the housing halves to appropriate positions.

The slicing blade 17 is arranged for rotation at a relatively high rate of speed so that the buns will be effectively sliced regardless of their condition. Preferably the blade rotates at approximately 1,750 R. P. M. The blade in the machine illustrated herein is approximately 10" in diameter, whereby a practical example of the machine and its mode of operation may be realized. The figures given herein are, of course, only examples as will be readily understood. Particularly in the case of soft buns, such as strictly fresh buns that are also hot, slicing of such buns has heretofore been a difficult problem. The high speed of rotation of the slicing blade and the smooth cutting edge of the blade, together with the ribs 124 and 126, effectively slice such buns, as well as buns in all other conditions. The ribs prevent rotation of the buns, such as might otherwise be due to rotation of the blade, and the high speed of the blade overcomes any tendency of the material of the bun to being chewed by the blade, which is particularly true in the case of soft and hot buns. The engagement between the surfaces of the guide channel and the buns establishes a retarding reaction to the action of the blade in the slicing operation, i. e., the buns are prevented from being merely thrown or knocked through the guide channel by the blade without being properly sliced. The elements of the guide channel are adjusted to the proper position for establishing the proper reaction referred to.

As a further feature of efficiency and effectiveness of the machine, the blade is made of extremely hard metal and sharpened to an extremely sharp edge. The bevel 138 of the blade, in the case of a 10" blade, is approximately 1" in radial direction. Such a broad or wide bevel enhances the slicing operation as contrasted with a short bevel which would tend to hack or chew the material of the bun. On the other hand, the bevel should not be too broad, because if it is too broad, it produces cut surfaces on the bun halves that are not plane, but curved, in which case, when the bun halves are placed cut face down on a griddle for toasting, the toasting takes effect mostly around the periphery and not entirely across the cut faces. With the bevel of the approximate dimensions given above, cut faces as nearly as possible to plane surfaces are produced consistent with maximum efficiency in the slicing operation.

The fact that the blade is made of hard steel enables sharpening of the blade by any suitable tools without leaving burrs or irregularities on the blade that might be dislodged therefrom and become embedded in the buns. Attention is directed to the effectiveness of a smooth-edge blade as contrasted with a saw-type blade, the latter having been used before but with only a very limited degree of success in slicing hard buns and virtually no success in slicing soft or hot buns.

By adjusting the motor 15 and thereby the slicing blade 17 by means of the crank 52, as explained above, the slicing blade can be adjusted horizontally toward and from the front wall 82 of the bun guide channel 81. Fig. 3 shows the edge of the blade spaced from the wall of the bun guide while Figs. 7 to 10 show the edge of the blade substantially coincident with the wall. If it is desired not to cut the bun entirely through but to have the bun halves connected together by a "hinge" portion, the blade can be set in a position similar to that shown in Fig. 3, while if it is desired to slice the bun entirely through, the blade is adjusted to its foremost position, illustrated in Figs. 7 to 10. Slicing of the bun only partially through is made possible by the action of the ribs in restraining the bun against rotation, a result not attainable if the bun were to rotate.

Thus two forms of adjustment of the bun slicing machine are provided, the one for accommodating buns of different sizes and the other for controlling the depth of the slice.

As mentioned above, the ribs 124 and 126 extend from a position adjacent the top of the bun guide channel to a position below the axis of the blade. As the buns are carried down through the bun guide channel assurance is provided that the buns will be sliced fully in a vertical direction to the desired depth in accordance with the setting of the blade. The deepest portion of the cut is formed by that portion of the blade disposed horizontally from the axis and the ribs 124 and 126 retain the buns against rotation or other undesired displacement until the uppermost portions of the buns reach and pass the position in horizontal alignment with the axis of the blade. Therefore, the cut or slice in each bun is uniform throughout the vertical dimension of the bun. Due to the fact that the buns, when being sliced, engage only the ribs 124 and 126 and not that portion of the guide channel between the ribs, a considerable latitude in the degree of adjustment of the housing halves relatively toward and from each other is provided. It has been found that a latitude of approximately ⅛" in the case of any particular bun is permitted with substantially uniform effectiveness. The ribs sink into or slightly indent the surfaces of the buns and because they engage the buns in localized areas, totaling appreciably less than the total area, the pressure exerted on the bun finds a certain degree of relief between the ribs whereby the latitude above mentioned is made possible.

Preferably the extended edges of the ribs 124 lie in a plane and the same holds true for the ribs 126. The front wall 82 of the guide channel is slightly curved as shown in Figs. 7 to 10, with the rib 124a extending from one of the curved surfaces forming that wall. This one rib is of less depth than the remaining ribs for the purpose of having its extended edge disposed in a plane containing the extended edges of the remaining ribs.

The bun slicing machine will slice buns extremely rapidly, the high rate of speed of rotation of the slicing blade produces rapid slicing of each bun, and because of the latitude permitted in the position of adjustment of the elements of the bun channel, buns that are nominally of one size but varying in thickness to a minor extent may be successively sliced without the necessity of making adjustments for those different thicknesses.

I claim:

1. In a bun slicing machine, a housing including a guide channel having an inlet at one end and an outlet at the other end and a plurality of longitudinally extending, laterally spaced ribs on each of opposite inner surfaces, the ribs on each of said surfaces having their inner edges lying substantially in a plane, and a blade in the housing having a portion extending into said guide channel and mounted for rotation in a plane disposed between and substantially parallel with said rib edge planes.

2. In a bun slicing machine, a housing having a longitudinally extending guide channel open at both ends, and a blade mounted in the housing with a portion extending into said guide channel and lying in and being rotatable in a plane extending longitudinally of the guide channel, said blade being adjustable in its own plane toward and from the side of the guide channel most remote from the axis of rotation of the blade, said guide channel having longitudinally extending ribs on each of its inner surfaces that are disposed on opposite sides of the plane of the blade, and at least one of the ribs on each of said surfaces being spaced a substantial distance from said most remote side of the guide channel.

3. In a bun slicing machine, a housing having a guide channel open at both ends, and a blade in said housing having a portion extending into said guide channel and disposed in and rotatable in a plane extending longitudinally of the guide channel, said guide channel having ribs on each of its inner surfaces on opposite sides of the plane of said blade, the ribs extending longitudinally of the guide channel and those on each surface being spaced apart in directions transverse to the guide channel.

4. In a bun slicing machine, a housing having a longitudinally extending guide channel open at both ends, and a blade mounted for rotation in the housing with a portion extending into said guide channel, said guide channel having longitudinally extending ribs on at least one side of its inner surface, the inner edges of said ribs lying in a surface spaced from and extending generally in the direction of the plane of the blade, said guide channel being made up of separable parts disposed respectively on opposite sides of the plane of the blade and being relatively adjustable toward and from each other in directions substantially transverse to the plane of the blade.

5. In a bun slicing machine, a housing having a longitudinally extending guide channel at one side thereof open at its ends, a blade in said housing with a portion extending into the guide channel and disposed in and rotatable in a plane extending longitudinally of the guide channel, said guide channel having longitudinally extending, laterally spaced ribs on each of its inner surfaces on opposite sides of the plane of the blade, said housing being made up of separable parts disposed on opposite sides of the blade plane and being hinged together at the side thereof opposite the guide channel, and adjustable connecting means interconnecting the parts of the housing at the side thereof opposite the hinge for moving the portions of the parts forming said guide channel toward and from each other in directions substantially transverse to the plane of the blade.

6. In a bun slicing machine, a base, a housing mounted on the base including a vertical guide channel having a top opening and a bottom opening and a blade in the housing rotatable in a vertical plane, said blade having a portion disposed in alignment with said openings, said guide channel having laterally spaced, vertical ribs on at least one of its inner surfaces that are disposed on opposite sides of the plane of the blade, and a motor mounted on the base for rotatably mounting said blade and being adjustable for adjustably moving said blade horizontally in its own plane.

7. In a bun slicing machine, a base, a housing mounted on the base having a channel including a top opening and a bottom opening, a blade in the housing rotatable in a vertical plane, said blade having a portion disposed in alignment with said openings, a motor mounted on said base for rotatably mounting said blade, means for mounting said motor having a projection extending through said base, means reacting between said projection and base for yieldingly retaining the motor on the base, and adjusting means interconnecting said projection and base and operative for adjustably moving the motor and thereby moving said blade horizontally in its own plane, said base and motor mounting means having interengageable stop means for limiting movement of the motor in one direction to a position wherein the edge of the blade is closely adjacent the vertical wall portion of said channel most remote from the axis of rotation of the blade, said most remote wall portion having a cavity for receiving the edge portion of the blade, said channel having vertical ribs on at least one inner surface with the inner edges of the ribs lying in a surface spaced from and extending generally in the direction of the plane of the blade, at least one of the ribs being spaced a substantial distance from the said most remote wall portion.

8. In a bun slicing machine, a housing having a vertical bun channel at one side thereof open at top and bottom, a blade in the housing disposed in a vertical plane and having a portion extending into said channel, said housing being made up of parts disposed respectively on opposite sides of the plane of the blade, said channel being unobstructed and dimensioned for engagement by a bun on both of the inner surfaces thereof on opposite sides of the plane of the blade, and having a plurality of spaced vertical ribs on each of said surfaces, the inner edges of said ribs on each surface lying in a plane extending generally in the direction of the plane of the blade, said parts being hinged at the side thereof opposite said channel for relative swinging movement of the parts about a vertical axis for effectively enlarging and reducing the dimension of said channel in a direction transverse to the plane of the blade, resilient means urging the swinging ends of said parts relatively apart, and means for adjustably moving the swinging ends of the parts relatively toward each other.

9. In a bun slicing machine, a housing made up of parts which when fitted together engage each other in a surface disposed in a vertical plane, one of the parts being relatively fixed and the other part being movable toward and from the one part in directions generally transverse to said plane, said housing having a vertical guide channel at one side thereof open at top and bottom, a blade in said housing disposed in and rotatable in said plane, said guide channel having vertical ribs on at least one of its inner surfaces that are disposed on opposite sides of the plane of the blade, said blade being fixed against axial movement and adjustably movable horizontally in said plane, and means for rotatably mounting said blade.

10. In a bun slicing machine for slicing buns of various shapes and sizes, a housing having a vertical guide channel at one side thereof open at top and bottom, and a blade in the housing with a portion extending into the guide channel disposed in and rotatable in a plane extending longitudinally of the channel, said channel having a plurality of vertical ribs on each of its inner surfaces on opposite sides of the plane of said blade, the ribs on both of said surfaces forming a group adjacent the periphery of the blade for engagement by a bun having small dimension in the direction transversely of the channel and in the plane of the blade, and the remaining ribs on both of said surfaces being respectively spaced in the direction transversely of the channel and in the plane of the blade for engagement variously by buns having various dimensions in the direction of the spacing of the ribs.

(References on following page)

References Cited in the file of this patent

UNITED STATES PATENTS

| | | |
|---|---|---|
| 1,329,755 | Dunkley | Feb. 3, 1920 |
| 1,380,393 | Knapp | June 7, 1921 |
| 1,615,836 | Halpen | Feb. 1, 1927 |
| 1,879,796 | Ehrlich | Sept. 27, 1932 |
| 1,903,238 | Larson | Mar. 28, 1933 |
| 2,010,865 | Kingsbway | Aug. 13, 1935 |
| 2,235,546 | Ahrndt | Mar. 18, 1941 |
| 2,347,007 | Tod | Apr. 18, 1944 |
| 2,549,540 | Spilky | Apr. 17, 1951 |
| 2,673,583 | Skog | Mar. 30, 1954 |

FOREIGN PATENTS

| | | |
|---|---|---|
| 19,479 | Sweden | May 7, 1904 |